March 14, 1939.   G. KEINATH   2,150,377
ARRANGEMENT FOR TESTING THE INNER WORK ABSORBED BY MATERIALS
Filed Oct. 23, 1935   2 Sheets-Sheet 1
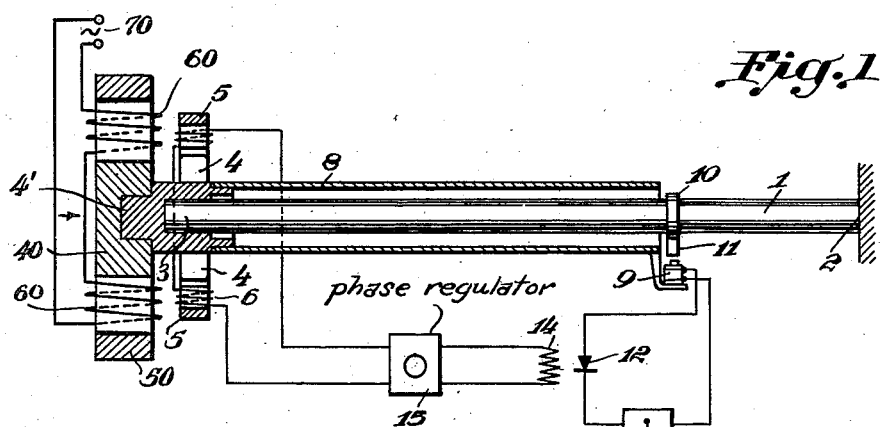
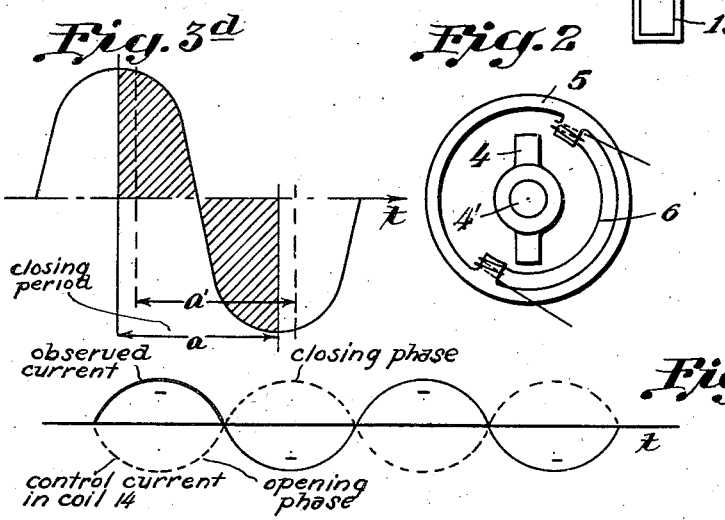
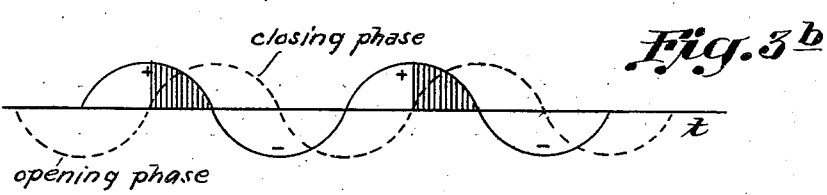
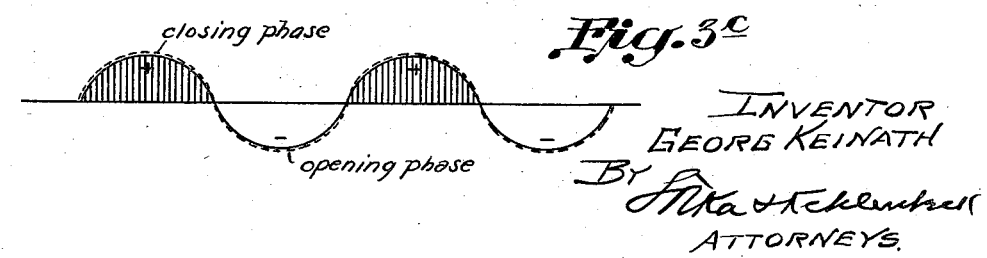
INVENTOR
GEORG KEINATH
BY
ATTORNEYS.

March 14, 1939.   G. KEINATH   2,150,377
ARRANGEMENT FOR TESTING THE INNER WORK ABSORBED BY MATERIALS
Filed Oct. 23, 1935   2 Sheets-Sheet 2

Inventor
Georg Keinath
by Knight Brothers
Atty

Patented Mar. 14, 1939

2,150,377

UNITED STATES PATENT OFFICE 2,150,377

ARRANGEMENT FOR TESTING THE INNER WORK ABSORBED BY MATERIALS

Georg Keinath, Berlin-Charlottenburg, Germany, assignor to Siemens & Halske, Aktiengesellschaft Siemensstadt, near Berlin, Germany, a corporation of Germany Application October 23, 1935, Serial No. 46,274
In Germany October 26, 1934

9 Claims. (Cl. 265—13)

My invention relates to an arrangement for testing the inner work absorbed by materials. In explanation of the term "inner work", I desire to state that a perfectly or "ideally" elastic body could be subjected to deformations without any energy being lost by internal friction within said body. Such an ideally elastic body does not exist, however, and all substances available to us never attain perfect elasticity, so that when they are subjected to deformation, a certain portion of the energy employed for the deformation, even though this portion may be small in many cases, is always used up or destroyed by internal friction within the body undergoing such deformation. The internal friction occurring under such circumstances is what I mean by the term "inner work".

It is well known in the art to carry out fatigue tests for testing materials, during which the material is subjected to a varying load up to the point of rupture. The tests of the above character are very complicated, since such continuous run tests have to be carried out in most cases with a gradually increasing load, until the limit of the continuous load has finally been determined, at which the rupture of the test piece occurs. In order to do away with such time absorbing tests attempts have been made to thoroughly examine the behavior of the test piece when subjected to a rapidly varying continuous load. In this case, it has been found that between a force acting periodically at the end of a test rod and the deformation of the rod, coincidence of phase is at first present at a cross-section of the rod chosen at will, so long as the deformation remains completely within the elastical range of the material and that, however, a phase displacement occurs as soon as the limit of elasticity is attained. This phase displacement may be considered, as in the case of electrical conditions, as mechanical loss angle and taken as a measure for the load capacity of the material.

Optical methods have hitherto been employed for measuring this loss angle. These methods cannot, however, be readily employed for the available measuring devices and necessitate a relatively complicated adjustable construction of mirrors.

According to the present invention the measurement of the mechanical loss angle is facilitated by the use of the numerous available electrical measuring instruments which are assembled to form a phase-sensitive electrical measuring system or which are in themselves phase-sensitive measuring instruments. In particular, all such electrical systems may be employed which in electrical engineering serve to measure the loss angle.

In the accompanying drawings an embodiment of my invention for torsional oscillations is shown in diagrammatic form.

Fig. 1 shows the measuring device, with parts in longitudinal section, the device being provided with magnetic drive means for producing the oscillations;

Fig. 2 is an end view of the device of Fig. 1 viewed in the direction of the arrow shown in Fig. 1, the above-mentioned drive means being removed, and Figs. 3$^a$, 3$^b$ and 3$^c$ represent diagrams showing different phase relations between the control current and the observation current. Fig. 3$^d$ shows a similar diagram of explanatory nature.

Figure 4:
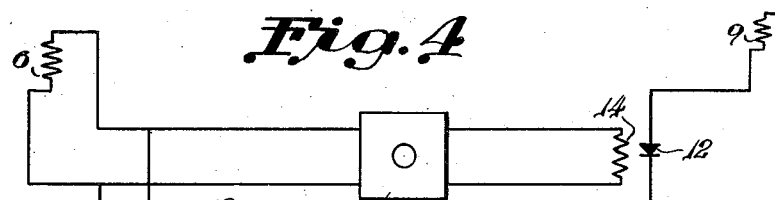
Figs. 4, 5 and 6 illustrate three different modifications of the measuring device shown in Fig. 1.

Referring to Fig. 1, 1 denotes the test rod, of which one end 2 is securely clamped. On the free end 3 a double-pole armature 4 is secured which is arranged in a double-pole magnetic system 5 with a coil 6. The armature 4 serves at the same time to carry a steel tube 8 enclosing a portion of the test rod, a coil 9 being secured to the free end of the steel tube 8. Immediately above the coil 9 a magnet 11 is firmly fixed on the rod 1, for instance, with the aid of a clamping ring 10. The coil is designed in such a manner that the amplitude of the voltage produced by the magnet 11 is proportional to the relative amplitude of oscillation between the coil 9 and the magnet 11. The circuit of the coil is connected with a direct-current measuring or indicating instrument 13 through a separately excited synchronous switch 12 which may be of any suitable form, for example, a vibratory rectifier. Rectifiers of this type are known in the art. For instance the U. S. Patent No. 2,011,384, to Wilhelm Thal shows such an instrumentality. In this patent the coils 39 are the equivalents of coil 14 in the present case, the vibrator tongue 37 of the patent is represented by the transverse line portion of present element 12, and the contact screw 37' of the patent is represented by the arrow point of present element 12. For the purposes of the description of the form of the invention shown in present Fig. 1 and as one example of the manner in which the invention may be reduced to practice, it is assumed that the rectifier 12 is of the form disclosed in the aforementioned patent, but other forms may serve as well. The exciting winding 14 of the rectifier 12 is connected to the secondary side of a phase advancer or phase regulator 15 whose primary side is connected to the winding 6. Such phase regulator may be of any customary or approved construction, and is desirable in this case for reasons which will appear from the following.

For setting up oscillations in the rod any well-known device may be used which engages the free end 3 of the rod. In the embodiment shown in Fig. 1, the hub-shaped body 4' of the armature 4 is provided with a second magnetic armature 40 cooperating with a stationary magnet system 50 whose energizing coils 60 are connected with an alternating current source 70. The energization of the magnet system 60 causes the armature 50 and the end 3 of the test rod 1 to oscillate in synchronism with the alternating current of source 70.

If the amplitude of oscillation of the test rod is at first made so small that the deformation of the test rod remains below the critical stress, then all cross-sections of the rod oscillate at first in phase with one another. In this manner, an alternating current is produced in the coil 6 and controls the rectifier 12 through the exciting winding 14. By the relative movement between magnet 11 and coil 9, an alternating current is generated in this coil, which is supplied to the rectifier 12 and measuring instrument 13. If the phase regulator aforementioned is adjusted at small rod oscillation amplitudes, at which the deformation of the rod remains safely below the critical stress aforementioned, until the readings at instrument 13 are zero, a condition is brought about in the system which is illustrated in the diagram Fig. 3ª. In this diagram the observed alternating current generated in coil 9 may be in its positive period shown in a full line. Through the phase adjuster 15, the phase of the current flowing in control coil 14 is very exactly adjusted so that during this positive period of the observed current the vibrator tongue of the rectifier is off its contact and the rectifier is in its open phase, shown in dotted line in Fig. 3ª, and as a result the indiiating instrument does not receive any positive current to which it otherwise would react. When thereupon the control current phase in coil 14 changes to the phase in which the tongue closes the vibrator contact, the alternating current generated in coil 9 will be at that time in its negative period to which the direct current indicating instrument does not react. Thus by this initial phase adjuster setting which remains the same throughout the entire test period, the control and observation currents are brought into exactly opposite phase relation. This zero indication of the measuring instrument remains, even at increased oscillation amplitude of rod 1, so long as the deformation occasioned by it remains below the critical stress.

Let us now assume a considerable increase in the oscillation amplitude of test rod 1 to a point beyond the critical stress, and due to which the oscillations of the rod, at the point where armature 11 is attached, lag in phase behind the forced oscillations applied to it at the end where armature 4 is attached. In such a case, also the alternating current generated in coil 9 will correspondingly lag in phase behind the control current flowing in control coil 14. Assuming, for instance, a lag of 90°, we would have a phase relation between the control current and the observed current as shown in Fig. 3ᵇ. There the last half of the positive observation current period flows during the closing phase of the vibrator which is indicated by the shaded portion. This now occurs at every positive period and instrument 13 reacts to this current and gives an indication of corresponding magnitude. Thus the greater the stress of the rod beyond the critical point, the greater the phase difference between the control current and the observed current will be until the maximum is attained at which the closing phase of the control current is entirely in phase with the positive period of the observation current and instrument 13 will give its maximum indication. This condition is shown in Fig. 3ᶜ, in which the full and the dotted lines coincide, and in which the shaded portion shows the reaction of the entire observed current upon the measuring instrument.

The diagram of Fig. 3ᵈ refers to the operation of the same arrangement, in case a measuring instrument 13 is employed to which the positive as well as the negative phase of a current may be supplied. The distance $a$ designates a closing period of the synchronous switch 12. As long as no phase displacement occurs between the voltage of coil 6 which effects the energization of coil 14 and the voltage induced in coil 9 which flows through the synchronous switch 12, equal portions of the half waves represented by the hatched areas in Fig. 3ᵈ will be supplied to the instrument 13 so that its pointer remains in zero position. As soon as a phase displacement occurs, the period $a$ is shifted with respect to the period of the voltage, so that now, for instance, $a'$ in Fig. 3ᵈ represents another phase position of the closing period. It will be seen from Fig. 3ᵈ that any phase displacement must result in deflecting the indicating instrument 13 in one or the other direction, because the opposite half-wave portions supplied to the instrument become different. Consequently, the phase displacement between the two cross-sections to be compared with one another may be directly read off from the deflection of the instrument 13. In this case it should be borne in mind that the deflection is not only dependent upon the phase displacement, but also upon the voltage, which in turn, however, depends upon the frequency and the amplitude. The influence of the frequency need not, consequently, be considered when calibrating, if always the same frequency is employed.

The effect of the amplitude on the result of the test may be either subsequently corrected or compensated for from the very beginning. As to the subsequent correction only the relation between amplitude and voltage in the coil 9 need be determined. From this a correction factor may be readily determined for every amplitude and the true measurement value may be read off from the correction table, as soon as the magnitude of the amplitude is known. However, the effect of the amplitude may also be compensated for differentially; for instance, instead of a simple instrument of the moving coil type, a cross coil instrument may be employed, the second coil of which supplies the directing force. If this second coil is fed with a voltage which varies in proportion to the amplitude, then the deflection of the measuring instrument directly indicates the phase angle. A voltage proportional to the amplitude may be, under certain circumstances, taken from the exciting winding 6 if the relations between the exciting voltage and the amplitude of oscillation for the materials to be tested are known.

An embodiment showing the above-mentioned modifications is illustrated in Fig. 4. In this figure the elements 6, 15, 14, 12 and 9 are identical with the similarly designated elements of Fig. 1, and it is to be understood that the coils 6 and 9 in Fig. 4 form part of the same torsional testing arrangement as shown in Fig. 1 and thus are energized in correspondence with the behavior of the specimen to be tested. Instead of the moving coil recorder 13 shown in Fig. 1, the embodiment of Fig. 4 is provided with a cross coil instrument 16 having a measuring coil 17 and a directing coil 18 mounted on each other so as to form a unit which is rotatable in the field of a magnet (not illustrated). Measuring coil 17 is connected in the circuit of coil 9, while the directing coil 18 lies in a circuit which branches off from the leads connecting the phase regulator with coil 6, a rectifier 19 being interposed between these leads and coil 18. The directing coil, therefore, is fed by a voltage which varies proportional to the amplitude of the oscillations of the test rod 1. Since at the same time the coil 17 is fed by a voltage corresponding to the relative amplitude at coil 9, the resultant deflection of instrument 16 corresponds to the phase angle to be determined.

The above-mentioned embodiments are only some of the numerous possible forms for carrying out the invention. In the majority of cases, it is desirable to observe or determine not only the phase displacement, but also the values of the amplitudes of the torsional oscillations corresponding to the several phase displacements. In such cases, I may either arrange a second measuring instrument which is fed by a voltage corresponding to the amplitudes of the torsional oscillations or I may employ a recorder, in which the corresponding values of the phase angle and of the amplitude of oscillations are recorded close to one another on the same time ordinates. Under certain circumstances, it may be more convenient to use a recording in which the amplitude of the torsional oscillations and the phase angle are brought directly into relation with one another, for instance by causing the recording pen of a standard recorder to be shifted in accordance with the phase angle, while the record sheet has a movement corresponding to the variation of the amplitude of the torsional oscillations.

Some embodiments illustrating the foregoing modifications are described in the following:

In the arrangement of Fig. 4, a second measuring instrument 21 of the moving coil type is connected with coil 6. The deflections of the moving coil 20 of this instrument indicate the amplitudes of oscillation of the test rod.

Figure 5:
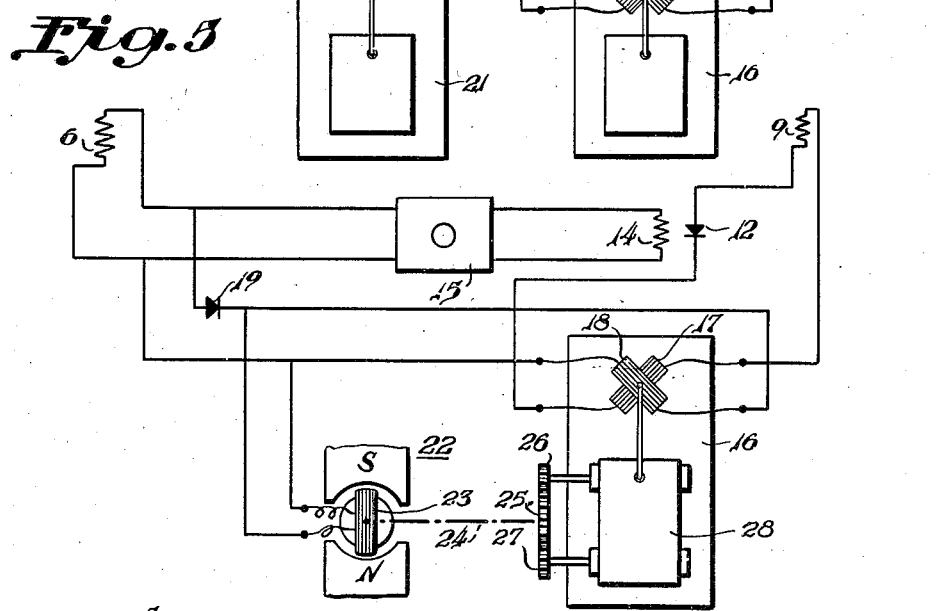

In the arrangement shown in Fig. 5, the phase angle and the amplitude of oscillation are recorded in direct relation to each other by causing a pen, for recording the phase angle, to cooperate with a record sheet moving in dependence upon the torsional amplitude. The coils 6 and 9 shown in Fig. 5 are again to be understood as forming part of the torsional testing apparatus illustrated in Fig. 1, and the recording instrument 16 of Fig. 5 having crossed coils 17 and 18 resembles that of Fig. 4, except that the record sheet 28 is not moved uniformly, as usual, by a clock-work or the like, but is actuated by a moving coil system 22, the moving coil 23 of which is disposed between magnet poles N and S and connected with the circuit of coil 6 so as to lie in parallel with the directing coil 18 of recorder 16. Coil 23, therefore, is moved in proportion to the torsional amplitude. By means of a mechanical connection, represented in Fig. 5 by a dot and dash line 24, and through cog wheels 25, 26 and 27, the record sheet 28 of recorder 16 is driven so as to move in proportion to the amplitude of coil 23. In this manner a diagram is recorded on sheet 28 which shows the phase angle in dependence upon the torsional amplitude.

The invention may also be carried out with arrangements similar to the foregoing, in which, however, the coil 9 is arranged stationarily.

Figure 6:
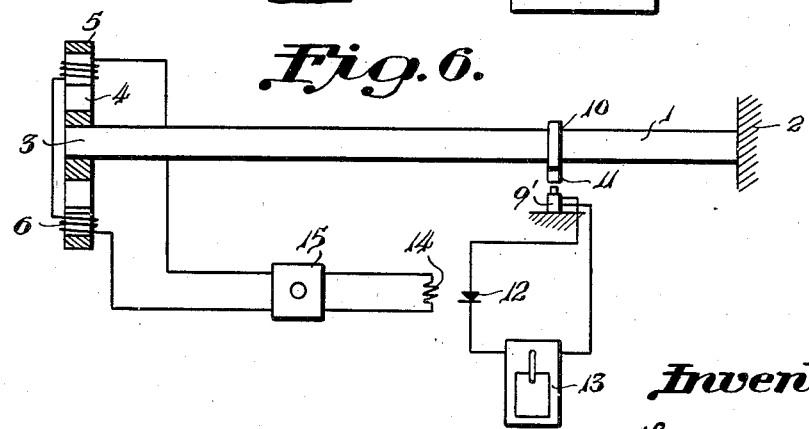

In this way, the construction of the device or arrangement is considerably simplified and all electrical wires may also be stationary. An embodiment of this kind is illustrated in Fig. 6. The arrangement largely resembles that of Fig. 1, the tube 8 of Fig. 1 being omitted and the coil 9 being replaced by a stationary coil 9'. On proper adjustment of the electrical members, the arrangement obtains the same results as that of Fig. 1.

The members 4 and 11 which are secured to the test piece 1 at a distance from each other, are preferably permanent magnets which by their movements relatively to the respective coils 6 and 9 produce currents utilized in the manner described above.

I claim as my invention:

1. In an apparatus of the class described, two devices located at a distance from each other and each comprising two relatively movable members one of which is adapted to be secured to a test piece, said devices containing coils in which currents are produced by the relative movement of the two members of the same device, a rectifier and a direct-current measuring instrument and connections for operating them through the medium of the current produced in one of said devices, rectifier-controlling means, and a phase-regulator having connections for energizing it by the current produced in the other of said devices and also having connections to actuate said rectifier-controlling means.

2. In an apparatus for measuring the mechanical energy loss in materials by submitting the test piece to oscillations, in combinations, two electromagnetic devices spaced apart in direction of the oscillation axis, each of said devices comprising two members movable with respect to each other, one of which is adapted to be secured to the test piece and coils for producing alternating currents by the relative movements of the two members of the same device, a mechanical, separately controlled rectifier having a switch and magnetic means for actuating said switch, and a direct current measuring instrument connected with said switch and one of said devices to be actuated by the current of said device in accordance with the operations of said switch, said magnetic means being electrically connected with said other device for actuating said switch in synchronism with the current of said other device.

3. In an apparatus for measuring the mechanical energy loss in materials by submitting the test piece to oscillations, in combination, two electromagnetic devices spaced apart in direction of the oscillation axis, each of said devices comprising two members movable with respect to each other, one of which is adapted to be secured to the test piece and coils for producing alternating currents by the relative movements of the two members of the same device, a separately controlled rectifier electrically connected with one of said devices, a direct current instrument connected with said rectifier, and means for controlling said rectifier, said means being electrically connected with said other device for controlling said rectifier in synchronism with the current of said other device.

4. In an apparatus for measuring the mechanical energy loss in materials by submitting the test piece to oscillations, in combination, two electromagnetic devices spaced apart in direction of the oscillation axis, each of said devices comprising two members movable with respect to each other, one of said two members consisting of a permanent magnet designed for being secured to the test piece, the other of said two members containing an electric coil for producing alternating currents by the movement of the pertaining permanent magnet with respect to said coil, a vibratory, separately controlled rectifier electrically connected with the coil of one of said devices, a direct current instrument connected with said rectifier, and means for controlling said rectifier, said means being electrically connected with the coil of said other device for controlling said rectifier in synchronism with the current produced in the coil of said other device.

5. In an apparatus of the class described, in combination means for subjecting an elongated specimen of the material to be tested to oscillations, an electromagnetic device arranged near the end of the testing length of said specimen and comprising two members movable relatively to each other and a coil for producing alternating currents by the relative movement of said two members, one of said members being stationary and the other being designed to be secured to said specimen, a rigid carrier designed to be secured to said device, a second electromagnetic device arranged at an intermediate point of said testing length and comprising two members movable relatively to each other and a coil for producing alternating currents by the relative movement of said latter two members, one of said latter members being secured to said carrier, the other of said latter members being designed to be secured to said specimen, a separately controlled rectifier electrically connected with the coil of one of said devices, a direct current instrument connected with said rectifier, and means for controlling said rectifier, said control means being connected with the coil of said other device.

6. In an apparatus of the class described, in combination means for subjecting an elongated specimen of the material to be tested to oscillations, two electromagnetic devices spaced apart longitudinally with respect to said specimen, each of said devices having a stationary member, a movable member designed to be secured to said specimen, and a coil for producing alternating currents by the movements of said movable member, a rectifier and a direct-current measuring instrument and connections for operating them through the medium of the current produced in one of said devices, rectifier-controlling means, and a phase-regulator having connections for energizing it by the current produced in the other of said devices and also having connections to actuate said rectifier-controlling means.

7. In an apparatus of the class described, in combination means for subjecting an elongated specimen of the material to be tested to oscillations, two devices located at a distance from each other and each comprising two relatively movable members one of which is adapted to be secured to a test piece, said devices containing coils in which currents are produced by the relative movement of the two members of the same device, a controllable rectifier connected with one of said devices, a cross coil instrument having one of its coils connected with said rectifier and its second coil connected with said other device, means connected with said other device for controlling said rectifier in synchronism with the currents produced in said other device, and phase-adjusting means disposed between said rectifier control means and said other device.

8. In an apparatus of the class described, in combination means for subjecting an elongated specimen of the material to be tested to oscillations, two electromagnetic devices spaced apart in direction of the oscillation axis, each of said devices comprising two members movable with respect to each other, one of which is adapted to be secured to the test piece and coils for producing alternating currents by the relative movements of the two members of the same device, the first of said devices being arranged near the end of the testing length of said specimen, said second device being arranged at an intermediate point of said testing length, a separately controlled rectifier electrically connected with said second device, a direct current instrument connected with said rectifier for indicating the angular phase difference of said specimen occurring between said two devices, means for controlling said rectifier, said means being electrically connected with said first device for controlling said rectifier in synchronism with the current of said other device, and means connected with said first device for effecting an indication corresponding to the torsional amplitude of said specimen.

9. In an apparatus of the class described, in combination means for subjecting an elongated specimen of the material to be tested to oscillations, two devices located at a distance from each other and each comprising two relatively movable members one of which is adapted to be secured to a test piece, said devices containing coils in which currents are produced by the relative movement of the two members of the same device, a controllable rectifier connected with one of said devices, a recording cross coil instrument having one of its coils connected with said rectifier and its second coil connected with said other device, said instrument having a recording pen to be actuated by said crossed coils of said instrument and a mecharism for transporting a record sheet, means connected with said other device for controlling said rectifier in synchronism with the currents produced in said other device, phase-adjusting means disposed between said rectifier control means and said other device, and driving means coupled with said mechanism and connected with said other device for causing said mechanism to move said record sheet corresponding to the torsional amplitude of said specimen.

GEORG KEINATH.